United States Patent Office 3,091,608
Patented May 28, 1963

---

3,091,608
PROCESS FOR THE PRODUCTION OF DERIVATIVES OF HYPOGLYCINE A
Albert Joseph Hermann Jöhl and Willy G. Stoll, Basel, Switzerland, assignors to Geigy Chemical Corporation, Ardsley, N.Y., a corporation of Delaware
No Drawing. Filed Jan. 29, 1960, Ser. No. 5,370
Claims priority, application Switzerland Jan. 30, 1959
2 Claims. (Cl. 260—112)

The present invention concerns a process for the production of derivatives of Hypoglycin A which has a hypoglycaemic action and was isolated by C. H. Hassal, K. Reyle and P. Feng, Nature 173, 356 (1954) from the unripe fruit of *Sapindaceae blighia sapida*, as well as the compounds obtained by this process which have valuable pharmacological, in particular blood sugar-reducing properties. They are useful for the treatment of diabetes mellitus in both perorally and parenterally of diabetes mellitus in man. Compared with Hypoglycin A which is used as starting compound in the process according to the invention, the derivatives according to the invention are much less toxic and have much better water solubility. Because of their acid character it is possible to produce with them more concentrated sodium salt solutions having a neutral reaction than with Hypoglycin A.

It has surprisingly been found that dipeptides of Hypoglycin A and its lower homologue are produced in good yield if a lower N-trifluoroacetyl glutamic acid-α-monoalkyl ester is reacted in an inert, anhydrous but advantageously water-miscible organic solvent and in the presence of a tertiary organic base, with a halogen formic acid alkyl ester or aralkyl ester, in particular with chloroformic acid isobutyl ester, the solution of the mixed anhydride of N-trifluoroacetyl glutamic acid-α-monoester and an alkoxy or aralkoxy formic acid obtained is reacted with the aqueous solution of an alkali metal salt of Hypoglycin A or of its lower homologue corresponding to the formula

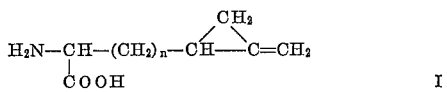

wherein *n* represents 1 or 0, and the reaction product is hydrolysed under alkaline conditions which preserve the peptide linkage. The above formula is based on the constitution given by C. von Holt and W. Leppla, Angew. Chem. 70, 25 (1958), as well as by S. Wilkinson, Chem. & Ind. 1958, 17.

Compounds of the general formula

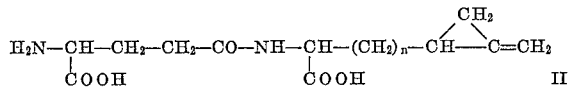

can be produced by the process defined above.

The reaction of the mixed anhydrides of N-trifluoracetyl glutamic acid-α-monoesters of the formula

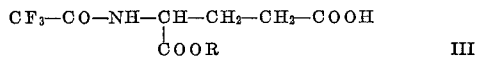

wherein R is a lower alkyl group, e.g. an ethyl or butyl group, and alkoxy or aralkoxy formic acids with Hypoglycin A or its lower homologue, produces intermediate products which correspond to the general formula

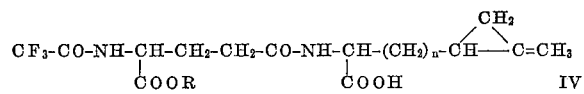

wherein R and *n* have the meanings given above.

All the steps in the reaction are performed at low temperatures; the anhydride formation and the reaction with Hypoglycin A for example at about $-15$ to $0°$ and the hydrolysis between $0°$ and room temperature. In particular tetrahydrofurane and dioxan are suitable solvents for the anhydride formation. Also, for example, chloroform can be used but this necessitates a two-phase reaction medium in the second step. Advantageously triethylamine or tributylamine is used as tertiary organic base. The hydrolysis is performed, for example, in a water miscible inert solvent with the addition of 1 N-caustic soda lye in an amount corresponding to the trifluoroacetamide groups and, possibly, ester groups present.

In addition to the chloroformic acid isobutyl ester already mentioned, also chloroformic acid ethyl ester, n-propyl ester, isopropyl ester, sec. butyl ester or benzyl ester can be used as halogen formic acid ester.

The following example further illustrates the performance of the process according to the invention but it is in no way the sole method of performing same. The temperatures are in degrees centigrade.

*Example*

(*a*) 0.325 ml. of chloroformic acid isobutyl ester is added dropwise to a solution cooled to $-15°$ of 0.672 g. of N-trifluoroacetyl-L-glutamic acid-α-ethyl ester (see F. Weygand et al., Ber. 88, 26 (1955), 90, 634 (1957)) and 0.34 ml. of triethylamine in 12 ml. of tetrahydrofurane. The reaction mixture is kept for 7 minutes at $-15°$ and then an ice cold solution of 0.35 g. of pure Hypoglycin A in 2.48 ml. of 1 N-caustic soda lye is added within 45 seconds. The solution is finally stirred for 45 minutes at $-2$ to $-5°$.

The reaction mixture is diluted with 12 ml. of ice cold water, acidified with 2 N-hydrochloric acid to pH 2.5–3, and the tetrahydrofurane is distilled off in vacuo in the cold. The reaction product separates as a viscous colourless oil. It is extracted with ethyl acetate, the extract is carefully washed with water and dried over $Na_2SO_4$. After distilling off the ethyl acetate in the vacuum, the product remains in the form of an oil which, after treatment with ethanol, benzene, cyclohexane and petroleum ether, crystallises. Yield: 0.874 g.=89%.

This crude product still contains some N-trifluoroacetyl-L-glutamic acid-α-ethyl ester. In order to remove this starting material as completely as possible, the crude product is dissolved in ether, the ethereal solution is extracted 10 times with a little water and dried over sodium sulphate. The crystalline residue is recrystallised twice from ether/petroleum ether. M.P. 100–103°, $[\alpha]_D^{27} = -15.6°$ ($\pm 2°$) (c.=1 in anhydrous ethanol).

*Analysis.*—Calculated for $C_{16}H_{21}O_6N_2F_3$ (394.36). Calculated: N=7.10%. Found: N=7.28%.

(*b*) 0.24 g. of the trifluoroacetyl-γ-L-glutamyl-Hypoglycin A-α-ethyl ester obtained above are dissolved in 2.5 ml. of dioxan and the solution is cooled to 12°. 1.84 ml. of 1 N-caustic soda lye are added within 10 minutes and the reaction mixture is left to stand for 50 minutes at 15°. After this time, the solution is adjusted to pH 3 with glacial acetic acid whereupon it is evaporated to dryness in a high vacuum at a bath temperature of 25°.

The residue is dissolved in 10 ml. of water and filtered through a column (28 x 2 cm.) of Dowex–1. (Acetate form: Dowex–1 is converted in the usual way into the acetate form and then washed with water until the eluate has a pH value of 4.8–5.0.) The salts are removed by washing the column with 1270 ml. of water whereupon the dipeptide is eluated with 345 ml. of 2 N-acetic acid and the filtrate is lyophilised. Residue 110–115 mg. (yield 67–70%). The dipeptide obtained by crystallisation from water/acetone, γ-L-glutamyl Hypoglycin A, has the $R_f$ values in the Partridge system, [n-butanol/glacial acetic acid/water (4:1:5)] of 0.58, in the pyridine/amyl alcohol/water (7:6:6) system of 0.22 and in the n-butanol saturated with water system of 0.04. (Paper chromatogrammes were determined by the descending method on Whatman No. 1 paper.) It has a double melting point of 192–194° and 205–210° (on decomposition).

What we claim is:

1. A process for the production of a derivative of Hypoglycin A, of the formula

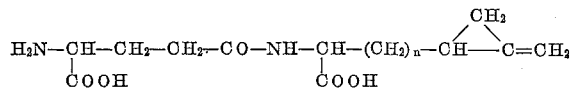

wherein $n$ is an integer from 0 to 1, which comprises reacting a lower N-trifluoroacetyl-glutamic acid-α-monoalkyl ester of the formula

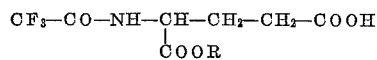

wherein R is a lower alkyl group, in an inert anhydrous organic solvent selected from the group consisting of tetrahydrofurane, dioxan and chloroform, in the presence of a tertiary amine selected from the group consisting of triethylamine and tributylamine and at a temperature of from −15° to 0° C. with a chloroformic acid ester selected from the group consisting of chloroformic lower alkyl esters and chloroformic benzyl ester to form a solution of the mixed anhydride of N-trifluoroacetyl-glutamic acid-α-monoester and a member selected from the group consisting of lower alkoxy formic acid and benzyloxy formic acid; reacting the said solution with the aqueous solution of an alkali metal salt of a compound of the formula

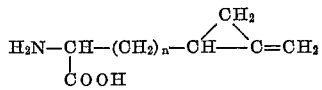

wherein $n$ has the meaning given above; and hydrolysing at a temperature ranging between 0° C. and room temperature in a water-miscible inert solvent the obtained reaction product of the formula

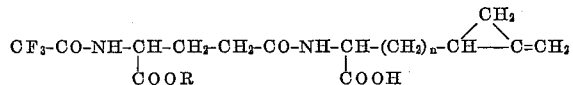

wherein $n$ has the meaning given above, under alkaline conditions which preserve the peptide linkage.

2. A process according to claim 1, wherein the initial reactants are chloroformic acid isobutyl ester and N-trifluoroacetyl-L-glutamic acid-α-ethyl ester, and the final product is γ-L-glutamyl-Hypoglycin A.

References Cited in the file of this patent

UNITED STATES PATENTS 2,933,487     Amiard et al. _____ Apr. 19, 1960

OTHER REFERENCES

Weygand et al., Chemische Berichte 90 (1957), pp. 634–638.

Wilkinson, Chemistry and Industry, Jan. 4, 1958, pp. 17 to 18.

Von Holt et al., "Angew. Chem." (1958), vol. 70, p. 25.